United States Patent
Yamashita

(12) 
(10) Patent No.: US 6,859,459 B1
(45) Date of Patent: Feb. 22, 2005

(54) HIGH-SPEED/HIGH-RELIABILITY ETHER TRANSMISSION SYSTEM AND I/F APPARATUS

(75) Inventor: Atsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 09/709,634

(22) Filed: Nov. 13, 2000

(30) Foreign Application Priority Data

Nov. 16, 1999 (JP) .......................................... 11-325712

(51) Int. Cl.[7] .............................................. H04L 12/28
(52) U.S. Cl. ...................................... 370/401; 370/254
(58) Field of Search ................................ 370/401, 402, 370/445, 446, 254, 229, 389

(56) References Cited

U.S. PATENT DOCUMENTS

| | | | | |
|---|---|---|---|---|
| 5,432,907 A | * | 7/1995 | Picazo et al. ................ | 709/249 |
| 5,442,630 A | * | 8/1995 | Gagliardi et al. ............ | 370/402 |
| 5,666,359 A | * | 9/1997 | Bennett et al. .............. | 370/358 |
| 6,072,803 A | * | 6/2000 | Allmond et al. ............. | 370/445 |
| 6,141,355 A | * | 10/2000 | Palmer et al. ............... | 370/465 |
| 6,151,297 A | | 11/2000 | Congdon et al. | |
| 6,301,620 B1 | | 10/2001 | Yoshida et al. | |
| 6,359,893 B1 | * | 3/2002 | Mills ........................... | 370/402 |
| 2001/0043614 A1 | * | 11/2001 | Viswanadham et al. ..... | 370/469 |

FOREIGN PATENT DOCUMENTS

| | | |
|---|---|---|
| JP | 63-284949 | 11/1988 |
| JP | 6-224908 | 8/1994 |
| JP | 6-311161 | 11/1994 |
| JP | 10-313335 | 11/1998 |
| JP | 10-336201 | 12/1998 |
| JP | 11-74927 | 3/1999 |

\* cited by examiner

*Primary Examiner*—Chi Pham
*Assistant Examiner*—Keith M. George
(74) *Attorney, Agent, or Firm*—Foley & Lardner LLP

(57) ABSTRACT

An I/F apparatus (D-Ether) with a high-speed/high reliability interface function is provided for a typical network configuration comprising information processing devices such as a plurality of computers (PCs), 100Base-T hubs (HUBs), and 100Base-T Ether cables (Ethers) for connection among them, and a local bus (bus) with a higher speed than that of the Ethers connects a PC to the D-Ether. The D-Ether includes a plurality of LAN controllers and has a function for receiving IP packets at high speed from PC (5) to sequentially transfer the IP packets to the plurality of ports at the speed of the Ether. In addition, the D-Ether has a function for receiving IP packets from the plurality of ports to transfer the IP packets to PC (5) or another Ether port. The transfer processing is performed with reference to a MAC to port table memory in which information on transfer targets of IP packets and ports to be used is stored.

31 Claims, 12 Drawing Sheets

HIGH-SPEED/HIGH-RELIABILITY ETHER TRANSMISSION SYSTEM AND I/F APPARATUS

BACKGROUND OF THE INVENTION

1. Field of the Invention

The present invention relates to an Ether transmission system, and more particularly to a high-speed/high-reliability Ether transmission system in a network physical layer and an I/F apparatus.

2. Description of the Related Art

It can be said that an Ether transmission system relating to a network physical layer is a de facto standard in configuring a LAN with the widespread use of the Internet. In other words, it is no exaggeration to say that most of the existing LANs employ the Ether transmission system. This results from an improved performance to cost ratio or the like in the network physical layer by the economies of mass production, and the domination of the Ether transmission system over other transmission systems.

The Ether transmission system comprises terminals such as computers and hubs having functions for reading a MAC (Media Access Control) address of a target in a data frame sent from the terminal and for transferring the data frame only to the terminal corresponding to the address, and the like.

As an access scheme, CSMA/CD (Carrier Sense Multiple Access/Collision Detection) is used. Specifically, while a terminal transmits, the other terminals connected to the same hub as the terminal cannot transmit. Thus, carrier sense is performed such that a check is made to determine whether data is present on a cable, and if no data is present, data is transmitted, thereby enabling multiple access in which accesses of a plurality of users are possible from terminals using a LAN. In addition, since a data leg collision occurs when a plurality of users simultaneously transmit data from respective terminals, an access scheme in which collision detection is performed is employed for retransmitting data individually after a predetermined amount of time.

Because of such features, only two terminals (terminals on transmission and reception) can simultaneously utilize the LAN and the transfer efficiency is not favorable. To eliminate the disadvantage, at present, a switching hub (a switching hub is hereinafter referred to as "hub") which allows communication among a plurality of pairs of terminals at the same time by dynamically and electrically switching connections among the plurality of terminals connected to the hub at the transmission has been developed and become remarkably popular.

In the Ether transmission system, as the number of terminals connected to the LAN is increased, the concentration of accesses to a file server and the like may cause a situation in which the transmission speed is gradually reduced. On the other hand, improvement in the speed in the network physical layer is always required in connection with advanced techniques for WWW or the like in reality. Specifically, needed is the improvement in the transmission speed between a terminal and a number of terminals and the improvement in the transmission speed between a terminal and a terminal.

To address such needs, for example, prior art (a) and prior art (b) have been proposed. In prior art (a), a higher speed is provided by an approach for radically changing the transmission system in the network physical layer such as the introduction of a gigabit Ether for the 100Base-T. In prior art (b), a higher speed is provided by utilizing a plurality of conventional network physical layers as disclosed in Japanese Patent Laid-open Publication No. 10-336201.

The approach of prior art (a) for providing a higher speed by radically changing the transmission system in the network physical layer is based on the idea of replacing the conventional network physical layer with a faster one. Since a transmission line itself is basically formed of a single line similarly to the conventional system, it is not possible to realize high reliability for faults of the transmission line and the like. In addition, when the network physical layer is replaced with a faster one, the performance thereof is not offered unless network physical layer interfaces at both ends of the transmission line are also replaced with faster ones in any transmission such as one-to-one communication and one-to-multiple communication. Thus, prior art (a) requires a significant initial investment for a higher speed and represents problems in terms of cost.

Next, the approach of prior art (b) for providing a higher speed by utilizing a plurality of network physical layers involves multiple-to-multiple connection or the like over relays, but lacks the contents of address resolution in an Ethernet protocol such as the relationship between an IP address and a MAC (Media Access Control) address, and it is interpreted as a network with its own protocol configured by using hardware of an Ether network between relays, and actually does not constitute an Ether network.

Specifically, in an Ether network, for transferring an Ether frame from a PC to an arbitrary target PC, it is necessary to know the IP address on the application in the target PC, and transfer control is possible only for the MAC address on the operating system (OS) corresponding to the IP address of the target PC at the transfer of a frame. Thus, when only the IP address of the target PC is known, an ARP protocol is used in which a frame for broadcasting a MAC address at frame transfer is sent to acquire a MAC address of a target in an ARP response. In contrast, prior art (b) lacks description of reasonable address resolution for a MAC address of a port, and it is considered as a system for simply recognizing only an opposing target to perform communication. In such a system, the Ether compatibility is not provided over relays, and a connection to a normal Ethernet is not possible and extensibility is poor.

If prior art (b) is applied to a network in which a corresponding relationship is provided between only one IP address possessed by an information processing device and a plurality of MAC addresses for a plurality of ports, it is contemplated that since no limitations are imposed on the MAC addresses, a collision occurs in the ARP protocol for broadcasting a MAC address, an alternative connection protocol to the ARP protocol is not present over relays and the like, and a special protocol in prior art (b) is present. In any case, a physical layer is realized without compatibility with the Ether transmission system.

Thus, prior art (b) is not necessarily an Ether transmission system but an approach which allows replacement with a prior art transmission system such as serial transmission, and realizes a network physical layer without compatibility with the Ether transmission system. In addition, since prior art (b) does not implement the ARP protocol, it has the problem of the inability to extend a network with the Ether transmission system by connecting another terminal between relays and the like.

SUMMARY OF THE INVENTION

It is an object of the present invention to provide a high-speed/high-reliability Ether transmission system and an I/F apparatus which solve the aforementioned problems and which can extend a network physical layer in the Ether transmission system to enable a higher speed and higher reliability, at low cost.

It is another object of the present invention to provide a function of extending a LAN configured with an Ether transmission system to a high-speed and high-reliability Ether transmission system at low cost.

The high-speed and high-reliability Ether transmission system of the present invention is characterized in that it comprises a plurality of Ether cables, a local bus connected to an information processing device and having a higher speed than that of the Ether cables, and an I/F apparatus, such that the Ether cables are connected through the I/F apparatus to the local bus, wherein the I/F apparatus comprises a plurality of Ether ports connected to the Ether cables, a bus port connected to the local bus, a controller connected to the Ether ports and the bus port, and a MAC to port table for storing a corresponding relationship between a MAC address to which an Ether frame is to be transferred and the Ether port or the bus port to which the frame is to be transferred, and wherein the controller refers to the MAC to port table when it receives an Ether frame having a MAC address to which the frame is to be transferred, and if the address to which the frame is to be transferred is stored in the MAC to port table, it transmits the Ether frame to a port to which the frame is to be transferred corresponding to the address, or if the MAC address to which the frame is to be transferred is not stored, it transmits the Ether frame to ports except a port which has received the Ether frame and stores a corresponding relationship between a MAC address from which the Ether frame has been transferred and the port which has received the frame in the MAC to port table, and when it receives an Ether frame having a broadcast MAC address, it transmits the Ether frame to all ports except a port which has received the Ether frame and stores a corresponding relationship between a MAC address from which the Ether frame has been transferred and the port which has received the frame in the MAC to port table.

The I/F apparatus of the present invention for connecting a network including information processing devices connected through Ether cables to another information processing device through a local bus having a higher speed than that of the Ether cable is characterized in that it comprises a plurality of Ether ports connected to the Ether cables, a bus port connected to the local bus, a controller connected to the Ether ports and to the bus port, and a MAC to port table for storing a corresponding relationship between a MAC address to which an Ether frame is to be transferred and the Ether port or the bus port to which the frame is to be transferred, wherein the controller refers to the MAC to port table when it receives an Ether frame having a MAC address to which the frame is to be transferred, and if the address to which the frame is to be transferred is stored in the MAC to port table, it transmits the Ether frame to a port to which the frame is to be transferred corresponding to the address, or if the MAC address to which the frame is to be transferred is not stored, it transmits the Ether frame to all ports except a port which has received the Ether frame and stores a corresponding relationship between a MAC address from which the Ether frame has been transferred and the port which has received the frame in the MAC to port table, and when it receives an Ether frame having a broadcast MAC address, it transmits the Ether frame to all ports except a port which has received the Ether frame and stores a corresponding relationship between a MAC address ins from which the Ether frame has been transferred and the port which has received the frame in the MAC to port table.

Network configurations which can be employed include a high-speed and high-reliability Ether transmission system for connecting a network including information processing devices and hubs connected through Ether cables to a local bus having a higher speed than that of the Ether cables through an I/F apparatus, a high-speed and high-reliability Ether transmission system for connecting Ether cables connected to a plurality of information processing devices to a local bus connected to another information processing device and having a higher speed than that of the Ether cables through an I/F apparatus, or a high-speed and high-reliability Ether transmission system for connecting a plurality of Ether cables to a local bus connected to an information processing device and having a higher speed than that of the Ether cables through an I/F apparatus.

As a more specific network configuration, an I/F apparatus with a high-speed/high-reliability interface function between an Ether cable and a local cable is provided for a typical network configuration comprising information processing devices such as computers, 100Base-T hubs, and 100Base-T Ether cables for connection among them, such that a local bus with a higher speed than that of the 100Base-T Ether cables connects an information processing device to the I/F apparatus. The I/F apparatus includes a plurality of LAN controllers therein corresponding to a plurality of Ether ports. The I/F apparatus has a function for receiving IP packets from the information processing device to transfer the packets to the plurality of ports. In addition, the I/F apparatus has a function for receiving IP packets from the plurality of ports to transfer the packets to the information processing device or another port. In brief, the I/F apparatus receives a request for transmitting an Ether frame from the information processing device and determines how Ether frames are transferred to the plurality of ports in accordance with a certain algorithm.

A local bus having a higher speed than that of an Ether cable is connected through an I/F apparatus to a general purpose Ethernet for use in a LAN to realize a high/speed and high/reliability Ether transmission system.

A local bus is added to a network including information processing devices, hubs and Ether cables for connection among them using a plurality of ports of a high/speed and high/reliability I/F apparatus to allow higher speed transmission in a network system. Also, even when one of the plurality of Ether cables becomes defective, it is possible to continue communication using the remaining ports to realize higher reliability of the transmission system.

In addition, the simultaneous use of the plurality of Ether cables enables configuration of a one-to-multiple network in a high speed transmission path for information processing devices such as between server computers and terminal computers as well as configuration of a LAN in which hubs are omitted.

DETAILED DESCRIPTION OF THE PREFERRED EMBODIMENTS

Next, description is made for an embodiment of a high-speed/high-reliability Ether transmission system and an I/F apparatus of the present invention with reference to the drawings.

Figure 1:
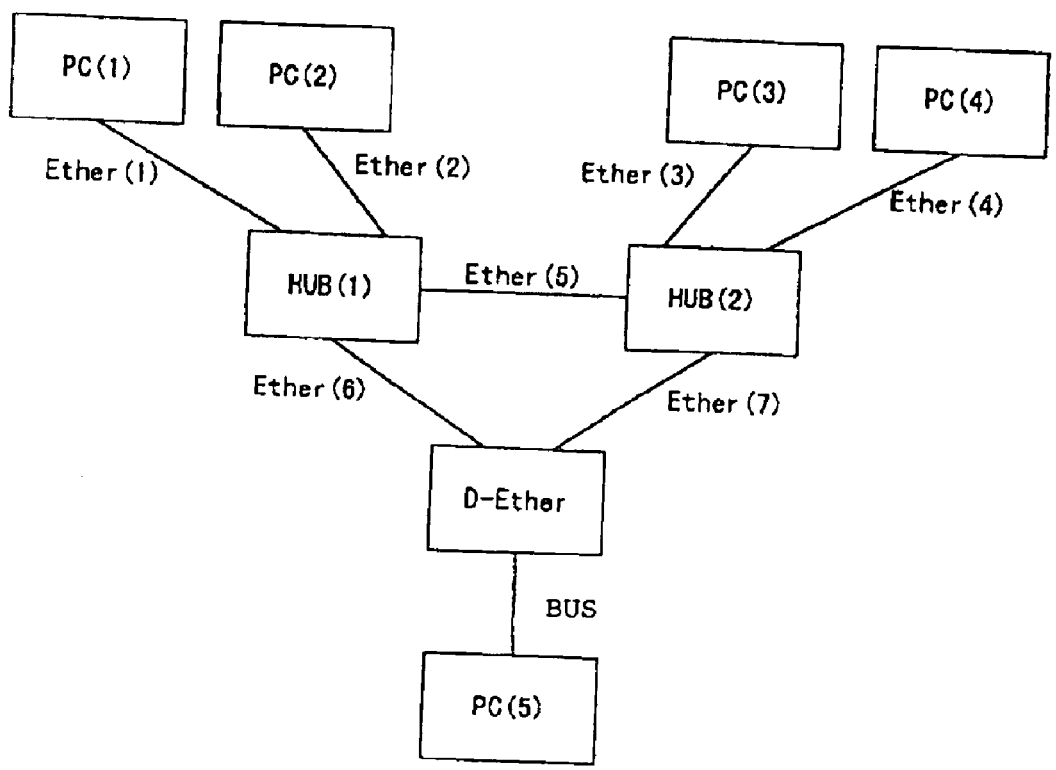
FIG. 1 is a diagram showing a network configuration for describing an embodiment of a high-speed/high-reliability Ether transmission system and an I/F apparatus of the present invention.

FIG. 1 is a diagram showing a network configuration relating to the embodiment. The network is configured such that an I/F apparatus (hereinafter also referred to as "D-Ether") with an high-speed/high-reliability interface function is provided for a typical network configuration of an Ether transmission system comprising information processing devices such as a plurality of computers (hereinafter also referred to as "PCs"), 100Base-T hubs (switching hubs, hereinafter also referred to as "HUBS"), and 100Base-T Ether cables (hereinafter also referred to as "Ethers") for connection among them, and a local bus (hereinafter also referred to as "bus") with a higher speed than that of the Ethers connects a PC to the D-Ether.

In the network configuration shown in FIG. 1, each HUB has a plurality of Ether ports, and the Ethers provide connection among a plurality of PCs (1) to (4) and the HUBs and the D-Ether. Specifically, HUB (1) is connected to PCs (1), (2), and HUB (2) is connected to PCs (3), (4) by the Ethers in one-to-one connection, respectively, HUB (1) is connected to HUB (2), HUBs (1), (2) are connected to the D-Ether by the Ethers, respectively, and the D-Ether is connected to PC (5) by the bus serving as a high-speed transmission line in one-to-one connection.

Ether ports of PCs (1) to (4) are assigned unique MAC addresses (1) to (4), respectively, and PC (5) is assigned MAC address (D). PCs (1) to (5) are also assigned unique IP addresses (1) to (5), respectively.

The functions of the respective components in the network of the embodiment are outlined as follows.

Each of PCs (1) to (4) provides an IP packet with the MAC address and transmits and receives it as an Ether frame through the Ether. Each of HUBs (1) and (2) has a collecting function for collecting the PCs or the like and a switching function for reading the MAC address of a PC or the like to which the frame is to be transferred stored in the Ether frame to send the Ether frame only to the port connected to the PC in which the Ether frame input through the Ether is switched to a designated Ether side before output, thereby controlling the relay for transmission and reception of IP packets between PCs (1) to (4) and PC (5). PC (5) transmits and receives IP packets to and from PCs (1) to (4) through the bus at high speed with the help of the relay by the D-Ether.

The D-Ether includes a plurality of Ether ports connected to HUBs (1), (2) in a one-to-multiple arrangement, and a bus port connected to PC (5) in a one-to-one arrangement. Each port is assigned unique MAC address (D) similarly to the Ether port of PC (5).

Figure 2:
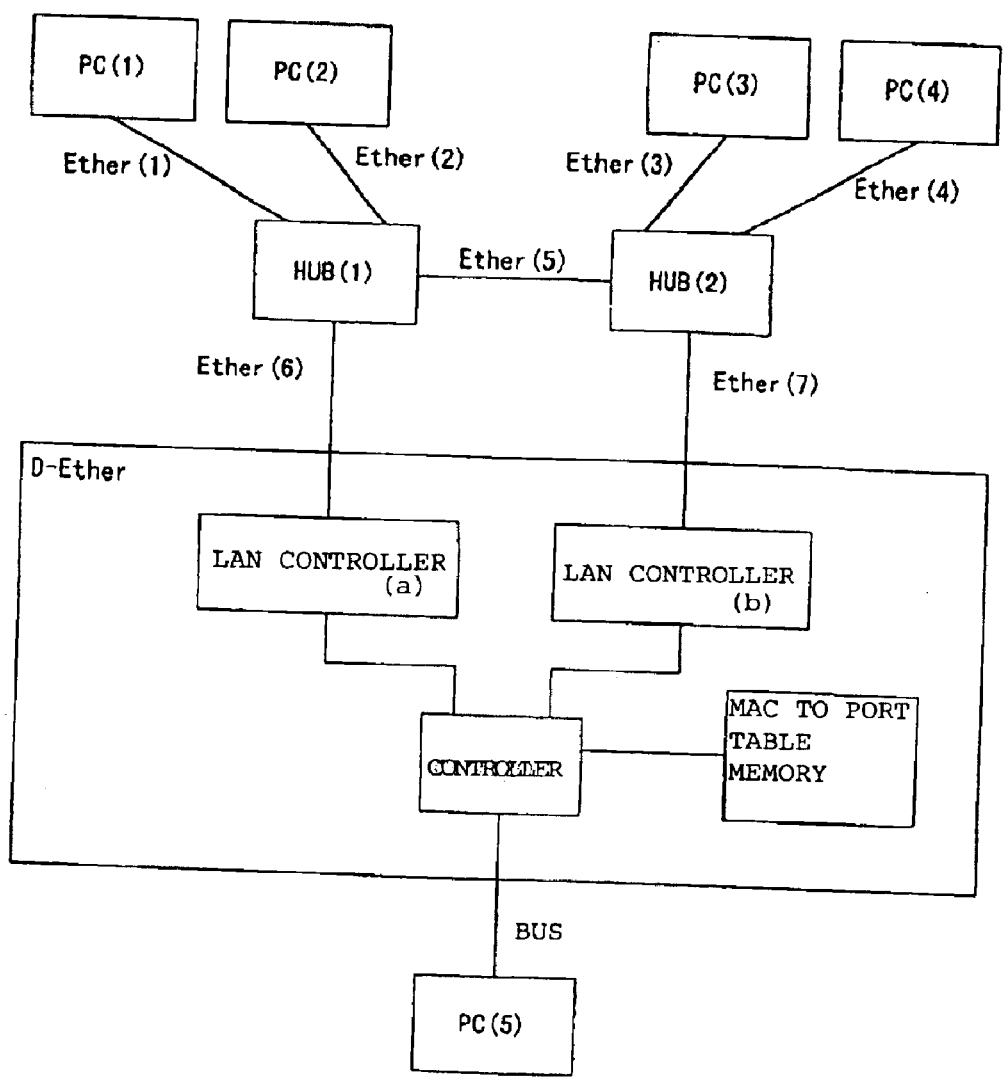
FIG. 2 is a diagram showing an internal configuration of a D-Ether in the embodiment.

FIG. 2 is a diagram showing the D-Ether of the network shown in FIG. 1 in detail. The D-Ether comprises a plurality of LAN controllers (a); (b) connected to the plurality of Ether ports, respectively, a controller connected to the bus port, and a MAC to port table memory connected to the controller. The D-Ether has a function for receiving IP packets at high speed from PC (5) to transfer the IP packets to the plurality of Ether ports at the transmission speed of the Ethers, and a function for receiving packets from the plurality of Ether ports to transfer the IP packets to PC (5) or another Ether port.

The transfer functions are performed in accordance with a certain algorithm in response to a request for transmitting an Ether frame from the bus port and a request for transmitting an Ether frame from the Ether port in LAN controllers (a), (b) and the controller connected to PC (5).

For realizing the aforementioned transfer functions, stored in the MAC to port table memory are information on MAC addresses of transfer targets, information on a plurality of ports (LAN controllers) which have communicated with the MAC addresses, and counter values for specifying the plurality of LAN controllers in turn. In addition, in the MAC to port table memory, MAC address (D) of the D-Ether itself and the information indicating the bus connection are stored as a set.

Figure 3:
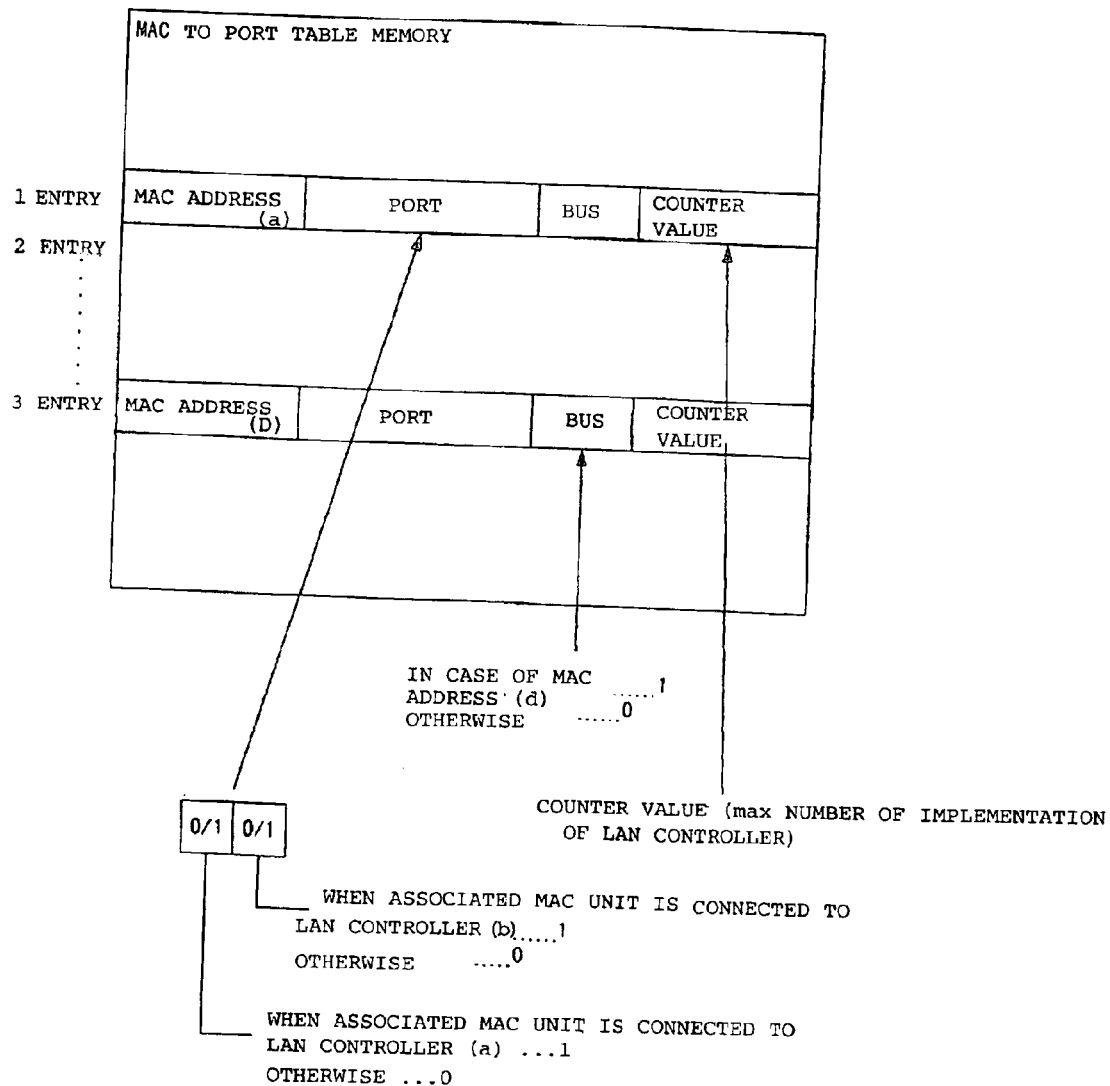
FIG. 3 is a diagram showing stored information in a MAC to port table memory.

FIG. 3 is a diagram showing the stored contents in the MAC to port table memory. In the MAC to port table memory, information comprising a MAC address of a unit connected to the network, port information, bus information and a counter value is stored for each entry number.

The MAC address information includes MAC addresses (1) to (4) and MAC address (D) of units to which an Ether frame is to be transmitted. Each of the port information relates to a port (LAN controller) to which an Ether frame is to be sent for each of the MAC addresses. When a plurality of LAN controllers exist, "1" or "0", for example, is recorded to indicate whether each of the LAN controllers can be connected to the associated unit. The bus information is stored as "1" or "0", for example, to indicate whether the associated MAC address is MAC address (D) of the D-Ether or not.

Each of the counter values corresponds to the number of Ether ports (LAN controllers) of the D-Ether through which an Ether frame can be transmitted to a PC with a predetermined MAC address, and can be counted one by one up to the maximum number m. The counter value is used as information for specifying in turn the plurality of Ether ports (LAN controllers) through which an Ether frame is transmitted. For the counter value, an operation and a storage update are performed. Specifically, for each transmission of an Ether frame through the transmitting port (transmission from a LAN controller), the counter value is incremented and modulo m operation is performed, and the counter value is overwritten with the operation result.

In FIG. 3, it is assumed that LAN controllers corresponding to a specific MAC address are two LAN controllers (a), (b), and both of them can be connected to the Ether port of the unit (for example, PC (1)) with the associated MAC address. Thus, FIG. 3 illustrates the port information including a set of two ports present and the counter value of "0" or "1" (maximum number =1).

The controller performs the following operations to achieve the aforementioned processing by the D-Ether.

1. When an Ether frame from PC (5) is input through the bus, the MAC to port table memory is searched for a MAC address to which the Ether frame is to be transferred.

1-1 When the intended MAC address is found, a set of ports (or a single port) are read from the MAC to port table memory, and the Ether frame is transmitted through the LAN controller specified by the counter value. The counter value is incremented and the MAC to port table memory is overwritten.

1-2 When the intended MAC address is not found, the Ether frame is transmitted through all the LAN controllers (LAN controller (a) and LAN controller (b)). At this point, a set of the MAC address (MAC address (D)) from which the Ether frame has been transferred and the information indicating the reception from the bus are stored in the MAC to port table memory.

2. When an Ether frame is input from LAN controller (a), the MAC to port table memory is searched for a MAC address to which the Ether frame is to be transferred.

2-1 When the intended MAC address is found, a set of ports (or a single port) or the information on bus connection is read from the MAC to port table memory. When the set of ports are obtained, the Ether frame is transmitted through the LAN controller specified by the counter value, the aforementioned counter value is incremented, and the MAC to port table memory is overwritten. When the bus connection is obtained, the Ether frame is transferred to the bus.

2-2 When the intended MAC address is not found, the Ether frame is transmitted through all the LAN controllers (LAN controller (b)) except LAN controller (a) and the bus. At this point, a set of the MAC address from which the Ether frame has been transferred and the port which has received the frame (LAN controller (a)) are stored in the MAC to port table memory.

2-3 When an Ether frame is input from LAN controller (b), similar processing is performed.

3. When an ARP request frame with a broadcast MAC address is input from the bus, the ARP request frame is transmitted through all the LAN controllers. At this point, a set of the MAC address (MAC address (D)) from which the ART request frame has been transferred and the information indicating the reception from the bus are stored in the MAC to port table memory.

4. When an ARP request frame (broadcast MAC address) is input from LAN controller (a), the ARP request frame is transmitted to the bus and the LAN controller (LAN controller (b)) except the LAN controller which has received the frame. At this point, a set of the MAC address from which the ARP request frame has been transferred and the port which has received the frame (LAN controller (a)) are stored in the MAC to port table memory.

5. When an ARP request frame is input from LAN controller (b), similar processing is performed.

6. When an ARP response frame is input from the bus, the MAC to port table memory is searched for a MAC address to which the ARP response frame is to be transferred.

6-1. When the intended MAC address is found, a set of ports (or a single port) are read from the MAC to port table memory, and the ARP response frame is transmitted through the LAN controller specified by the counter value. The counter value is incremented, and the MAC to port table memory is overwritten.

6-2 When the intended MAC address is not found, the ARP response frame is transmitted through all the LAN controllers (LAN controller (a) and LAN controller (b)). At this point, a set of the MAC address (MAC address (D)) from which the ARP response frame has been transferred and the information indicating the reception from the bus are stored in the MAC to port table memory.

7. When an ARP response is input from LAN controller (a), the MAC to port table memory is searched for a MAC address to which the ARP response frame is to be transferred.

7-1 When the intended MAC address is found, a set of ports (or a single port) or the information on bus connection is read from the MAC to port table memory. When the set of ports are obtained, the ARP response frame is transmitted through the LAN controller specified by the counter value, the counter value is incremented, and the MAC to port table memory is overwritten. When the bus connection is obtained, the ARP response frame is transferred to the bus.

7-2 When the intended MAC address is not found, the ARP response frame is transmitted through all the LAN controllers (LAN controller (b)) except LAN controller (a) and the bus. At this point, a set of the MAC address from which the ARP response frame has been transferred and the port which has received the frame (LAN controller (a)) are stored in the MAC to port table memory.

7-3 When an ARP response frame is input from LAN controller (b), similar processing is performed.

8. The contents of the MAC to port table memory are subjected to aging (initialization) at appropriate time intervals. However, only a set of MAC address (D) of PC (5) connected to the bus and the information explicitly indicating the bus connection are not initialized.

It should be noted that while the processing procedures 6 to 7-3 when an ARP response frame is input are actually the same as processing procedures 1 to 2-3 when an Ether frame is input, description is individually made for facilitating explanation.

In reality, it is unlikely that PC (5) connected to the bus is replaced (replaced with a unit having a different MAC address). Thus, as another implementation, a set of MAC address (D) of PC (5) connected to the bus and the information explicitly indicating the bus connection are stored in the MAC to port table memory at switching on power, and only this information is not initialized at the aging, thereby making it possible to omit the processing of storing the information of MAC address (D) in the MAC to port table memory in the aforementioned algorithm for providing a higher speed.

The processing operations with the aforementioned processing algorithm are summarized as follows: the contents in the MAC to port table memory are referred to, and if the MAC address to which an Ether frame is to be transferred is known, the frame is sent to a known port, or if the transfer target is not known or in the case of an ARP request or response, a set of the MAC address from which the frame has been transferred and the port which has received the Ether frame are stored in the MAC to port table memory to perform the operation of transmitting the Ether frame.

With these operations, when the D-Ether transmits an Ether frame from PC (5) connected thereto, it can check the MAC address of the Ether frame to be transmitted to know a plurality of paths through which the Ether frame can be transferred from the MAC to port table memory.

Since the PC executes the protocol for performing an ARP request at the first communication of an Ether frame, the contents in the MAC to port table memory are set at the first communication of an Ether frame.

The transmission speed on the Ethers is typically lower than the transmission speed on the bus, but in the embodiment, the use of the D-Ether for using the plurality of transmission ports in turn enables the addition of the high speed bus to the Ethers and the extension of the network, allowing a higher speed of the Ether transmission system. In addition, since the plurality of paths are used in order, even when one of the paths is blocked due to a fault, only the Ether frame transferred to the blocked path becomes lost. Since packet loss can be avoided in an upper network layer in the IP network, the transmission of an IP packet can be normally performed even in such a case. In other words, higher reliability can be achieved. Therefore, the network extension in the embodiment allows a higher speed and higher reliability in the Ether transmission system.

It should be noted that since the PCs, HUBs and Ethers in FIGS. 1 and 2 are well known to those skilled in the art, descriptions of their detailed configurations and operations are omitted.

(Description of Operation)

The operation in the embodiment is hereinafter described. The operation of the D-Ether is first described with reference to packet flows shown in FIGS. 4, 6, 7, 8 and 9, and contents in the MAC to port table memory shown in FIG. 5.

Figure 4:
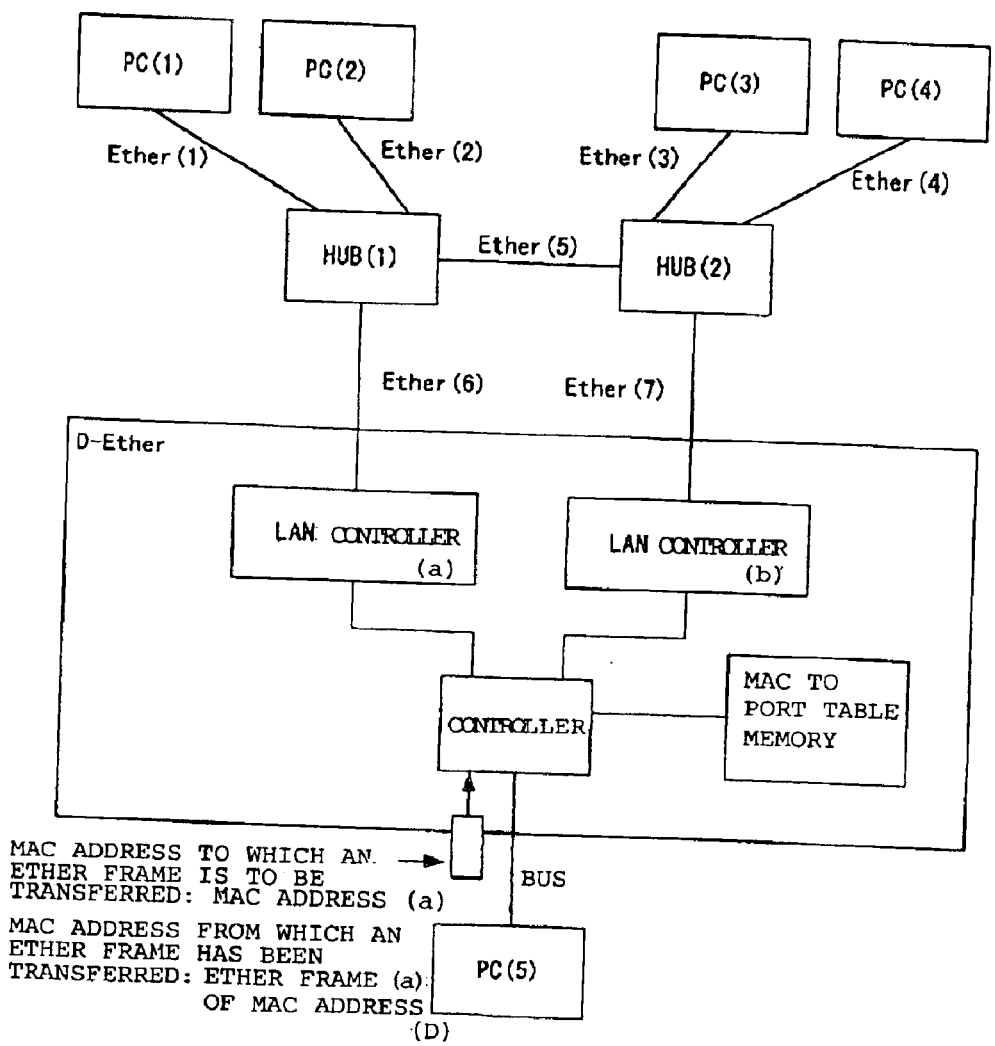
FIG. 4 is a diagram illustrating an operating state in which Ether frame (a) is input from a bus in the network shown in FIG. 2.
Figure 5:
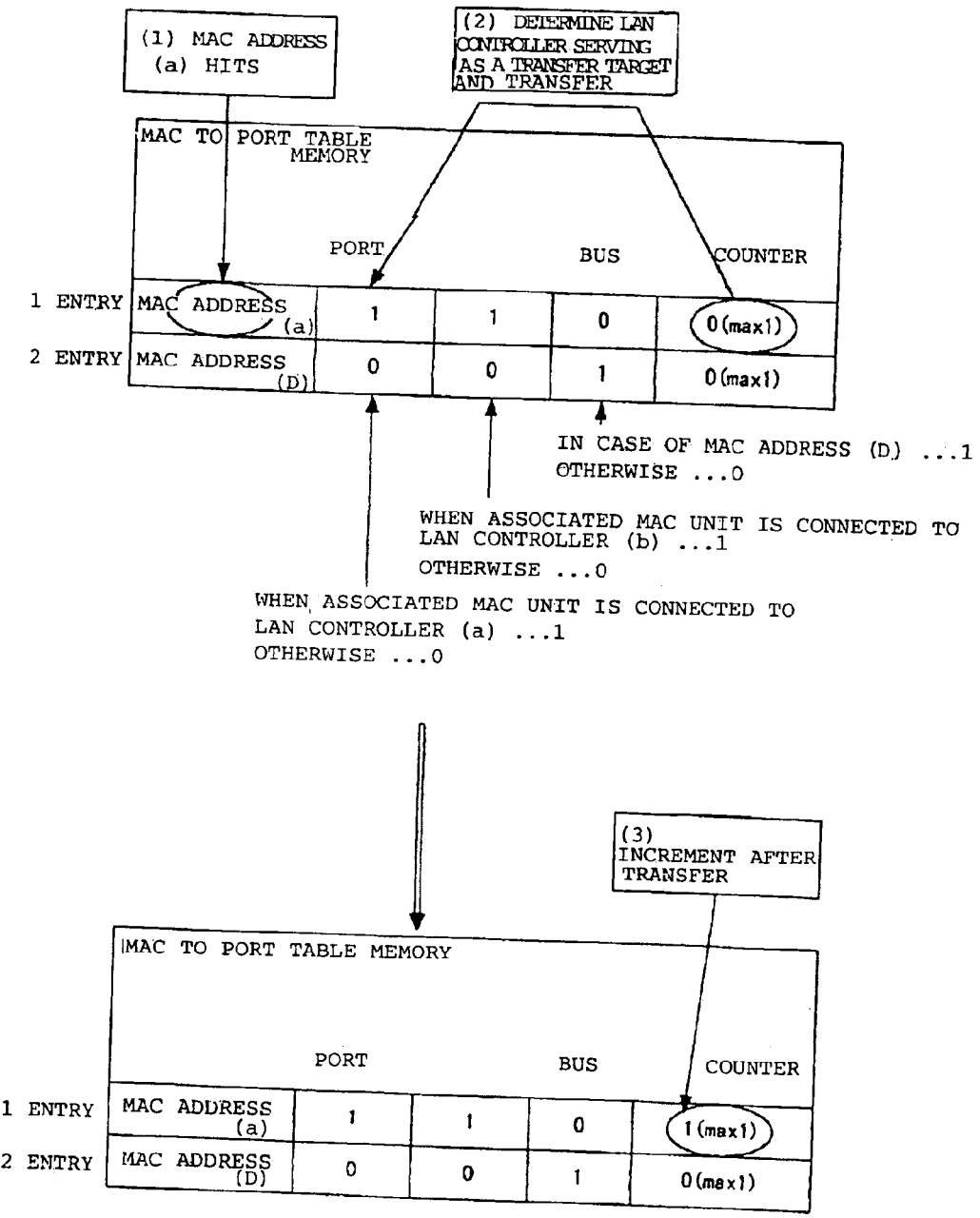
FIG. 5 is a diagram showing stored information in the MAC to port table memory in the network shown in FIG. 2.
Figure 6:
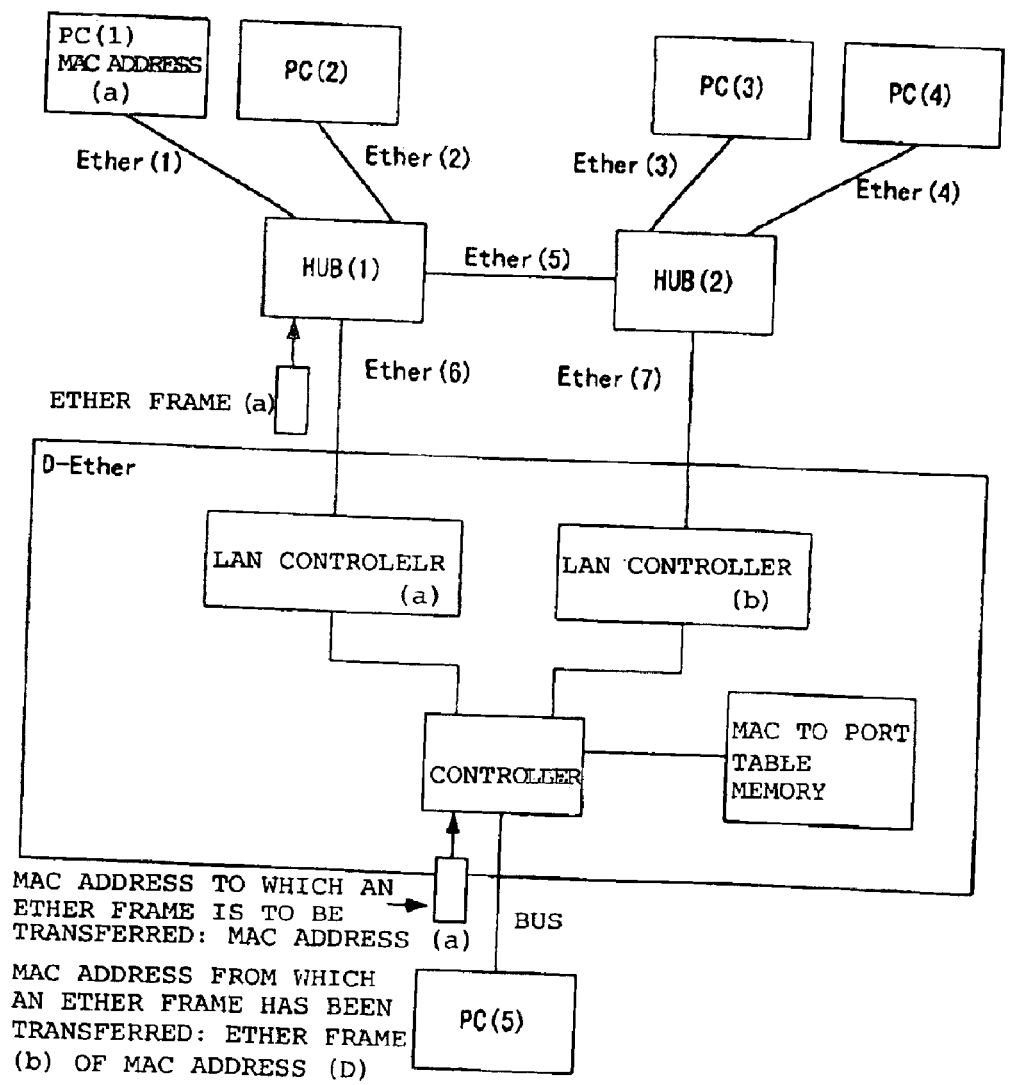
FIG. 6 is a diagram illustrating an operating state in which an Ether frame is transmitted from a LAN controller to a HUB.
Figure 7:
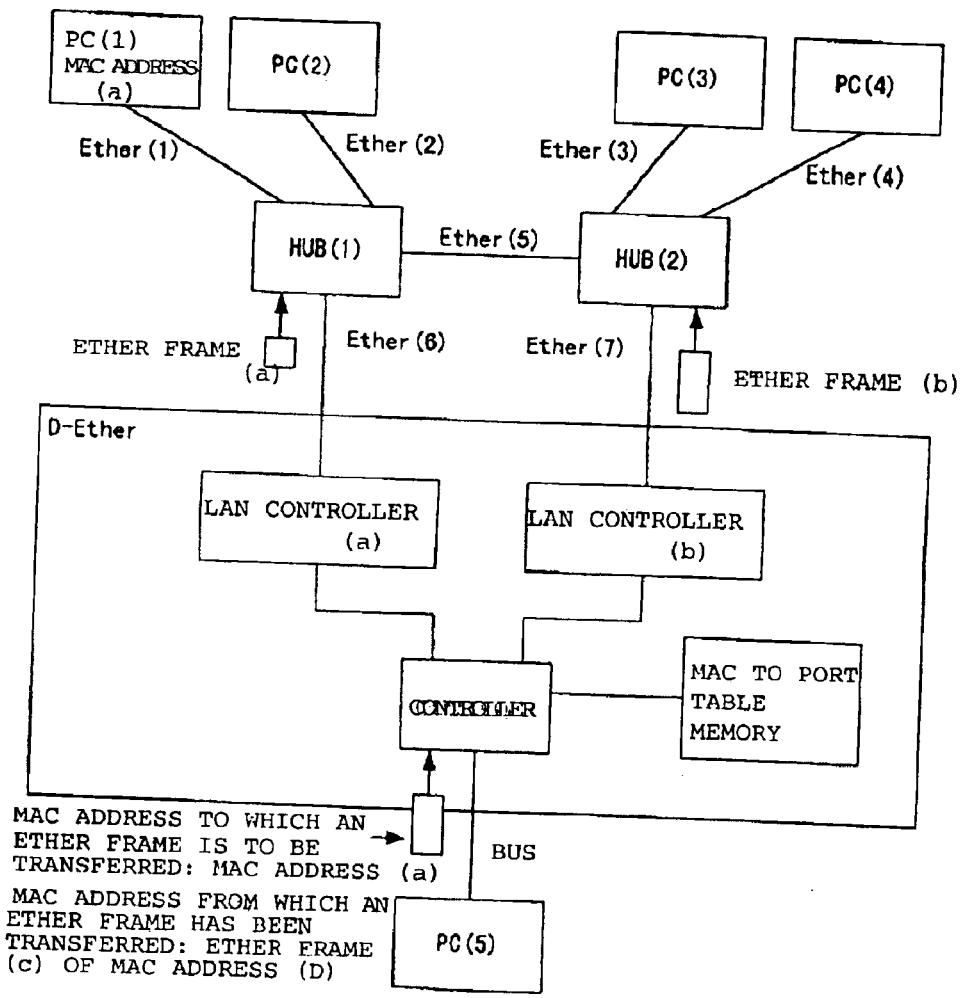
FIG. 7 is a diagram illustrating an operating state in which Ether frames (a), (b) are transmitted from LAN controllers (a), (b) to HUBs (1), (2), respectively.
Figure 8:
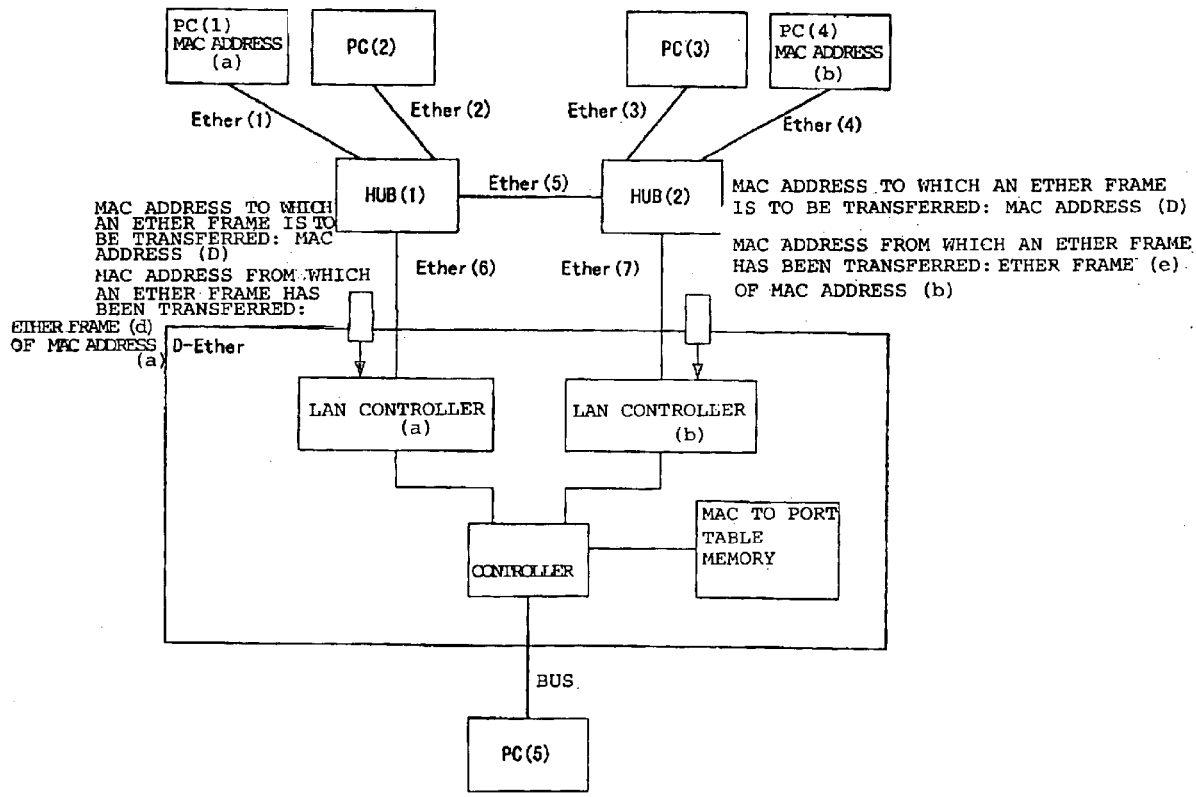
FIG. 8 is a diagram illustrating an operating state in which Ether frames (d), (e) are received by LAN controllers (a), (b), respectively.
Figure 9:
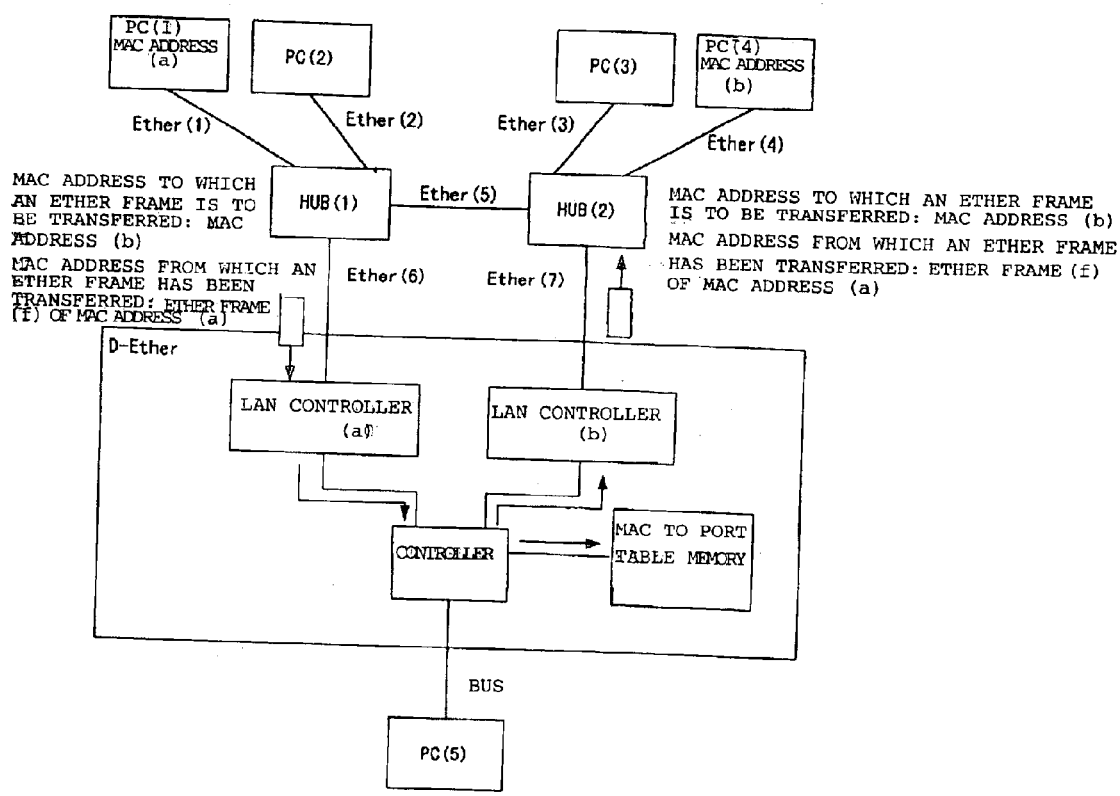
FIG. 9 is a diagram illustrating an operating state in which an Ether frame other than a frame with MAC address (D) is input from an Ether.

FIG. 4 illustrates an operating state in which Ether frame (a) is input from the bus in the network shown in FIG. 2, and FIG. 5 illustrates specific contents in the MAC to port table memory in the operation. FIG. 6 illustrates an operating state in which Ether frame (a) is sent from LAN controller (a) to HUB (1), and FIG. 7 illustrates an operating state in which Ether frames (a), (b) are sent from LAN controllers (a), (b) to HUBs (1), (2), respectively. FIG. 8 illustrates an operating state in which Ether frames (d), (e) are received by LAN controllers (a), (b), respectively. FIG. 9 illustrates an operating state in which an Ether frame other than an Ether frame with MAC address (D) is input from the Ether.

Typically, when Ether frame (a) is input from the bus as shown in FIG. 4, the controller within the D-Ether searches the MAC to port table memory to check whether a MAC address to which the frame is to be transferred is stored therein.

In the contents recorded in the MAC to port table memory shown in FIG. 5, since the entry of MAC address (a) exists in entry 1, and the information on LAN controller (a) serving as a transfer target and its counter value (order) are recorded, Ether frame (a) is transmitted to LAN controller (a) specified by the counter value 1 as shown in FIG. 6. Thereafter, the counter value in the MAC to port table memory is incremented and overwritten with the incremented counter value as in entry 1 shown in the lower portion of FIG. 5.

When the entry of MAC address (a) of the Ether frame is not present in the MAC to port table memory and no transfer target is found, or when the Ether frame is to be broadcast, the Ether frame is output from all LAN controllers (a), (b).

While Ether frame (a) is transmitted from LAN controller (a) as shown in FIG. 6, next Ether frame (b) can be input since the transfer speed of the bus is higher than that of the Ether. For Ether frame (b), the MAC to port table memory is also searched. At this time, since the counter value has been incremented, Ether frame (b) is sent to LAN controller (b) as shown in FIG. 7. In this manner, the operation of transmitting Ether frame (b) is performed during the transmission of Ether frame (a).

On the other hand, when Ether frame (d) to Ether frame (e) are simultaneously input from a plurality of PCs (1) to (4), Ether frame (d) to Ether frame (e) can be simultaneously received as shown in FIG. 8 since the LAN controller is divided into LAN controllers (a) and (b).

As another operation, as shown in FIG. 9, when an Ether frame other than an Ether frame with MAC address (D), for example Ether frame (f), is input from the Ether, the MAC to port table memory is searched for MAC address (b) to which the frame is to be transferred. If the entry is present, the frame is transferred to the associated port, or if no entry is present, the entry of MAC address (b) is stored and the frame is sent to all the ports except the port which has received the frame. In other words, the entry is stored and packet switching is performed similarly to a normal HUB.

(Other Embodiments)

While the aforementioned embodiment employs a single D-Ether of the present invention to extend a conventional LAN, the embodiment provides a higher speed for only part of the LAN since multi-line connection exists only between PC (5) and HUBs (1), (2).

Figure 10:
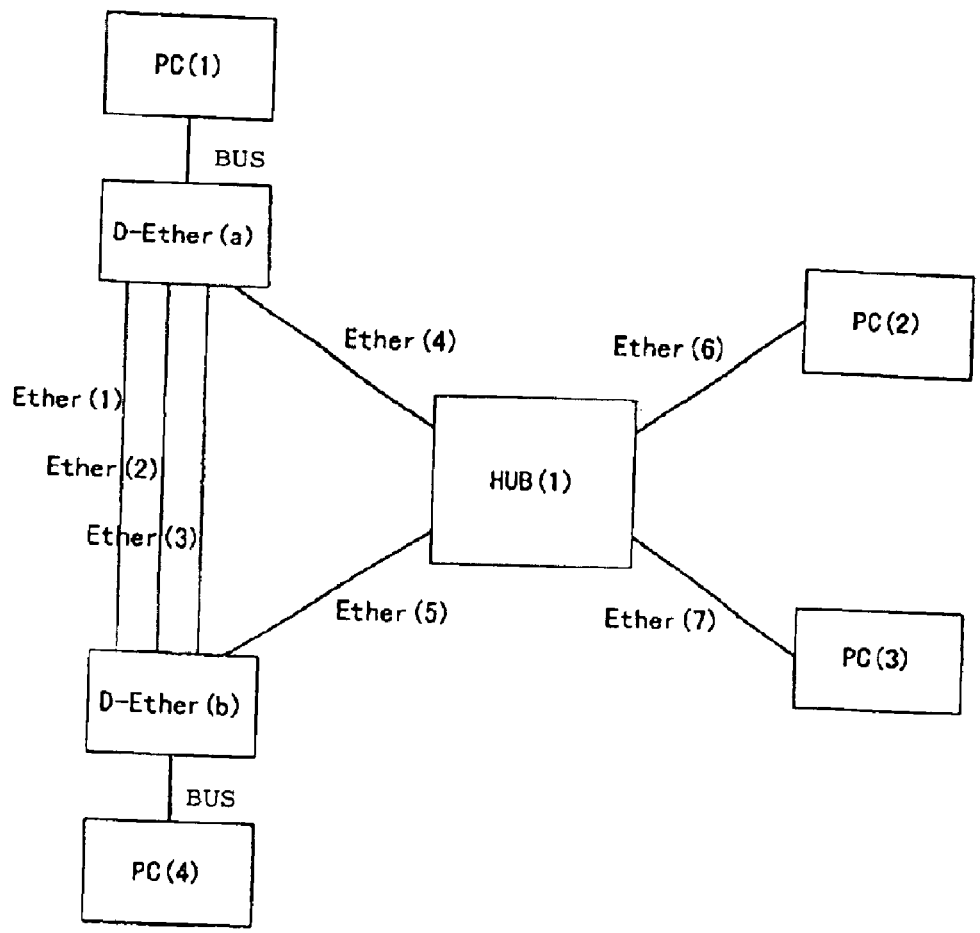
FIG. 10 is a diagram showing a network of another embodiment of the present invention.

FIG. 10 is a diagram showing a network of another embodiment of the present invention. The network is configured such that two D-Ethers are arranged opposite to each other to connect PC (1) with PC (4) through a plurality of Ethers (1) to (3), thereby allowing higher speed communication between PC (1) and PC (4).

In the embodiment, assuming that the time required for transmission on Ethers (1) to (3) is T1, the time T2 required for high speed transmission on a bus is smaller than T1, and T1≈T1−T2 can be considered. Thus, Ether frames can be simultaneously communicated.

Figure 11:
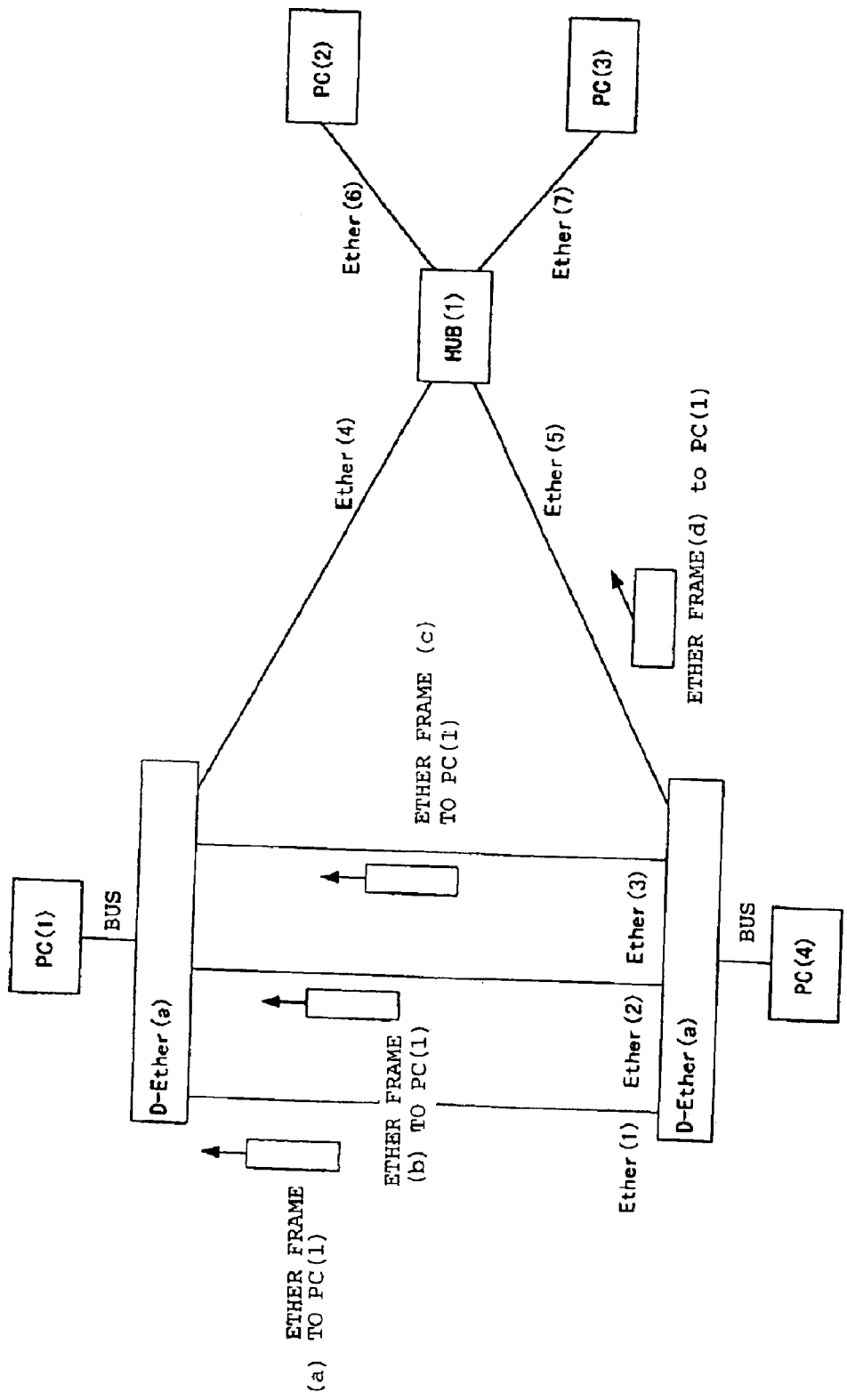
FIG. 11 is a diagram illustrating an operation for transmitting Ether frames at high speed between PCs in the embodiment shown in FIG. 10.

FIG. 11 illustrates an operation in which Ether frames are transmitted at high speed between PC (1) and PC (4), and at the same time, an Ether frame is transmitted between PC (4) and HUB (1).

It is possible that D-Ethers (a), (b) are arranged between PC (1) and PC (4) to simultaneously transmit Ether frames (a) to (c) on Ethers (1) to (3), and at the same time Ether frame (d) is transmitted to Hub (1), thereby allowing higher speed transmission of the Ether frames.

The embodiment is preferable for use in a system which comprises a plurality of server PCs (1), (4) for communicating a large amount of data and the like with each other and a plurality of clients PCs (2), (3). PC (1) and PC (4) are a set of loaded database machines. The remaining PC (2) and PC (3) are configured as client machines. Each of the server PCs has a large database stored therein. When the set of database machines periodically back up data mutually, exchange information on location of data and the like, a normal transmission system is likely to cause a collision between such communication and communication with a client to result in a lower speed. In the embodiment, however, higher speed communication is possible between PC (1) and PC (4), and such a lower speed can be prevented.

Applications of the embodiment includes user clients (PC2, PC3) for a local file server (PC1) of each department and for a backup file server (PC2) of all departments, user clients (PC2, PC3) for a circuit simulator server (PC1) and for a circuit library database server (PC2), or the like.

While the aforementioned embodiment provides description of an example in which the D-Ether has only one MAC address (D), some HUBs may not allow the same MAC address to exist for a plurality of ports in view of the internal structure of Ether equipment. In this case, MAC address (D1) and MAC address (D2) are set for respective ports of the D-Ether, IP address (D1) and IP address (D2) are assigned to the D-Ether, and an Ether frame from a bus is transmitted after it is converted such that it has IP address (D1)/MAC address (D1) or IP address (D2)/MAC address (D2) as its address from which the frame has been transmitted, thereby making it possible to realize the similar functions.

Figure 12:
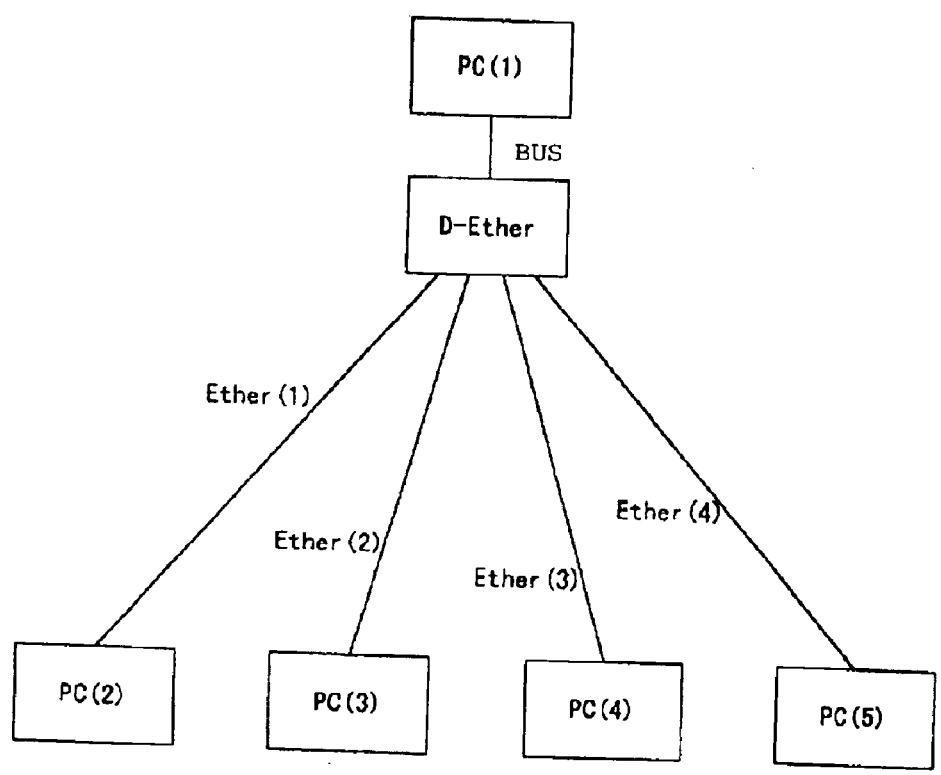
FIG. 12 is a diagram showing a network of another embodiment of the present invention.

FIG. 12 is a diagram illustrating a further embodiment of the present invention in which a D-Ether is arranged between a PC and a plurality of PCs to allow higher speed transmission between one PC and multiple PCs. Also in the embodiment, the number of a plurality of ports in the D-Ether can be increased to n with a similar basic configuration.

The embodiment is preferable for use in a system which comprises a server on which the concentration of data accesses occurs and a plurality of clients. For example, PC (1) is a server machine such as a file server having a large amount of data, and the remaining PCs (2) to (4) are client machines of users. Even when the concentration of file accesses occurs from respective client PCs (2) to (4), the system is less prone to a speed reduction than conventional systems since connection is made to server machine PC (1) through a bus with a higher speed via the D-Ether.

While the embodiment provides an example using the 100Base-T, a similar configuration with the D-Ether can also be achieved using another physical layer I/F (for example, 100BaseAnyLAN, gigabit Ether or the like).

According to the present invention, since the Ether transmission system is provided using the I/F apparatus having the plurality of input/output Ether ports for the Ether cables to the input/output bus port of the local bus, higher speed transmission than the transmission speed on conventional Ether cables can be realized. In particular, frames from the bus port can be substantially simultaneously transferred to the plurality of Ether ports for communication, thereby realizing a higher speed in the Ether transmission system.

In addition, since the Ether ports of the I/F apparatus support the Ether protocol and the interface on the opposite side of the I/F apparatus may be configured as in a normal Ether transmission system, it is possible to easily extend a conventional LAN.

Furthermore, the I/F apparatus evenly uses the plurality of Ether ports by controlling transfer to use the Ether ports in turn. Thus, communication is possible even when one of them is blocked due to a fault, thereby enabling high reliability to be realized Moreover, since the transmission of Ether frames between the plurality of ports of the I/F apparatus can realize the function similar to that of the hub, a LAN can be configured with hubs omitted. As a result, cost of the system can be reduced and an Ether transmission system can be realized with a high cost/performance ratio.

What is claimed is:

1. A high-speed/high-reliability Ether transmission system comprising a plurality of Ether cables, a local bus connected to an information processing device and having a higher speed than that of said Ether cables, and an I/F apparatus, said Ether cables being connected through said I/F apparatus to said local bus, wherein said I/F apparatus comprises a plurality of Ether ports connected to said Ether cables, a bus port connected to said local bus, a controller connected to said Ether ports and said bus port, and a MAC to port table memory for storing a corresponding relationship between a MAC address to which an Ether frame is to be transferred and said Ether ports or said bus port to which said frame is to be transferred, wherein said controller refers to said MAC to port table memory when it receives an Ether frame banns a MAC address to which said frame is to be transferred, and if said MAC address to which said frame is to be transferred is stored in said MAC to port table memory, it transmits said Ether fire to a port to which said frame is to be transferred corresponding to said MAC address, or if said MAC address to which said frame is to be transferred is, not stored, it transmits said Ether frame to ports except a port which has received said Ether frame and stores a corresponding relationship between a MAC address from which said Ether frame has been transferred and said port which has received said Ether frame in said MAC to port table memory, and when it receives an Ether frame having a broadcast MAC address, it transmits said Ether frame to all ports except a port which has received said Ether frame and stores a corresponding relationship between a MAC address from which said Ether frame has been transferred and said port which has received said Ether frame in said MAC to port table memory; and wherein said controller also stores a counter value for specifying one of a plurality of said Ether ports in turn at transmission of an Ether frame to said Ether ports when said plurality of Ether ports correspond to a single MAC address to which said frame is to be transferred in a corresponding relationship between a MAC address to which said frame is to be transferred and Ether ports to which said frame is to be transferred stored in said MAC to port table memory, and increments and updates said counter value each time an Ether frame is transferred to one of said plurality of ether ports.

2. The high-speed/high-reliability Ether transmission system according to claim 1, wherein an information processing device connected to said Ether cable transmits an ARP request frame having a broadcast MAC address at first transmission of an Ether frame.

3. The high-speed/high-reliability Ether transmission system according to claim 1, wherein an information processing device connected to said Ether cable transmits an ARP request frame having a broadcast MAC address at first transmission of an Ether frame.

4. The high-speed/high-reliability Ether transmission system according to claim 1, wherein said controller stores a corresponding relationship between a MAC address of said information processing device connected to said local bus and said bus port in said MAC to port table memory directly from said information processing device connected to said bus port at switching on power of said information processing device instead of storage based on a received Ether frame.

5. The high-speed/high-reliability Ether transmission system according to claim 4, wherein contents stored in said MAC to port table except a corresponding relationship between a MAC address of said information processing device connected to said local bus and said bus port are initialized at predetermined intervals.

6. The high-speed/high-reliability Ether transmission system according to claim 1, wherein contents stored in said MAC to port table except a corresponding relationship between a MAC address of said information processing device connected to said local bus and said bus port are initialized at predetermined intervals.

7. A high-speed/high-reliability Ether transmission system comprising a network including information processing devices and hubs connected through Ether cables, a local bus having a higher speed than that of said Ether cable, and an I/F apparatus, said network being connected through said IF apparatus to said local bus, wherein said I/F apparatus comprises a plurality of Ether ports connected to said Ether cables, a bus port connected to said local bus, a controller connected to said Ether ports and said bus port, and a MAC to port table, memory for storing a corresponding relationship between a MAC address, to which an Ether frame is to be transferred and said Ether ports or said bus port to which said frame is to be transferred, wherein said controller refers to said MAC to port table memory when it receives an Ether frame having a MAC address to which said frame is to be transferred, and if said MAC address to which said frame is to be transferred is stored in said MAC to port table memory, it transmits said Ether frame to a port to which said frame is to be transferred corresponding to said MAC address, or if said MAC address to which said frame is to be transferred is not stored, it tits said Ether frame to all ports except a port which has received said Ether frame and stores a corresponding relationship between a MAC address from which said Ether frame has been transferred and said port which tam received said Ether frame in said MAC to port table memory, and when it receives an Ether frame having a broadcast MAC address, it transmits said Ether frame to all ports except a port which has received said Ether frame and stores a corresponding relationship between a MAC address form which said Ether frame bas been transferred and said port which has received said Ether frame in said MAC to port table memory; and wherein said controller also stores a counter value for specifying one of a plurality of said Ether ports turn at transmission of an Ether frame to said Ether ports when said plurality of Ether ports correspond to a single MAC address to which said frame is to be transferred in a corresponding relationship between a MAC address to which said frame is to be transferred and Ether ports to which said frame is to be transferred stored in said MAC to port table memory, and increments and updates said counter value each time an Ether frame is transferred to one of said plurality of Ether ports.

8. The high-speed/high-reliability Ether transmission system according to claim 7, wherein an information processing device connected to said Ether cable transmits an ARP request frame having a broadcast MAC address at first transmission of an Ether frame.

9. The high-speed/high-reliability Ether transmission system according to claim 7, wherein said controller stores a corresponding relationship between a MAC address of said information processing device connected to said local bus and said bus port in said MAC to port table memory directly from said information processing device connected to said bus port at switching OD power of said information processing device instead of storage based on a received Ether frame.

10. The high-speed/high-reliability Ether transmission system according to claim 7, wherein contents stored in said MAC to port table except a corresponding relationship between a MAC address of said information processing device connected to said local bus and said bus port are initialized at predetermined intervals.

11. A high-speed/high-reliability Ether transmission system comprising a plurality of Ether cables connected to plurality of information processing devices, respectively, a local bus connected to another information processing device and having a higher speed than that of said Ether cables, and an I/F apparatus, said Ether cables being connected through said I/F apparatus to said local bus, wherein said I/F apparatus comprises & plurality of Ether ports connected to said Ether cables, a bus port connected to said local bus, a controller connected to said Ether posts and said bus port, and a MAC to port table memory for storing a corresponding relationship between a MAC address to which an Ether frame is to be transferred and said Ether ports or said bus port to which said frame is to be transferred, and wherein said controller refers to sad MAC to port table memory when it receives an Ether frame having a MAC address to which said frame is to be transferred, and if said MAC address to which said frame is to be transferred is stored in said MAC to port table memory, it transmits said Ether frame to a part to which said frame is to be transferred corresponding to said MAC address, or if said MAC address to which said frame is to be transferred is not stored, it transmits said Eter frame to all ports except a port which has received said Ether frame and- stores a corresponding relationship between a MAC address from which said Ether frame has been transferred and said port which has received said Ether frame in said MAC to part table memory, and when it receives an Ether frame having a broadcast MAC address, it transmits said Ether frame to all ports except a port which has received said Ether frame and stores a corresponding relationship between a MAC address from which said Ether frame has transferred and said port which has received said Ether frame in said MAC to port table memory; and wherein said controller also stores a counter value for specifying one of a plurality of said Ether ports in turn at transmission of an Ether frame to said Ether ports when said plurality of Ether ports correspond to a single MAC address to which said frame is to be transferred in a corresponding relationship between a MAC address to which said frame is to be transferred and Ether ports to which said frame is to be transferred stored in said MAC to port table memory, and increments and updates said counter value each time an Ether frame is transferred to one of said plurality of Ether ports.

12. The high-speed/high-reliability Ether transmission system according to claim 11, wherein an information processing device connected to said Ether cable transmits an ARP request frame having a broadcast MAC address at first transmission of an Ether frame.

13. The high-speed/high-reliability Ether transmission system according to claim 11, wherein said controller stores a corresponding relationship between a MAC address of said information processing device connected to said local bus and said bus port in said MAC to port table memory directly from said information processing device connected to said bus port at switching on power of said information processing device instead of storage based on a received Ether frame.

14. The high-speed/high-reliability Ether transmission system according to claim 11, wherein contents stored in said MAC to port table except a corresponding relationship between a MAC address of said information processing device connected to said local bus and said bus port are initialized at predetermined intervals.

15. An I/F apparatus for connecting a network including information processing devices connected through Ether cables to another information processing device through a local bus having a higher speed than that of said Ether cables, comprising:
- a plurality of Ether ports connected to said Ether cables;
- a bus port connected to said local bus;
- a controller connected to said Ether ports and to said bus port; and
- a MAC to port tale memory for storing a corresponding relationship between a MAC address to which an Ether frame is to be transferred and said Ether ports or said bus port to which said frame is to be transferred,
- wherein said controller refers to said MAC to port table memory when it receives an Ether frame having a MAC address to which said frame is to be transferred, and if said MAC address to which said frame is to be transferred is stored in said MAC to port table memory, it transmits said Ether frame to a port to which said frame is to be transferred corresponding to said MAC address, or if said MAC address to which said frame is to be transferred is not stored, it transmits said Ether frame to all ports except a port which has received said Ether frame and stores a corresponding relationship between a MAC address from which said Ether frame has bees transferred and said port which has received said Ether frame in said MAC to port table memory, and when it receives an Ether frame having a broadcast MAC address, it transmits said Ether frame to all ports except a port which has received, said Ether frame and stores a corresponding relationship between a MAC address from which said Ether frame has been transferred and said poll which has received said Ether frame in said MAC to port table memory; and
- wherein said controller also stores a counter value for specifying one of a plurality of said Ether ports in turn at transmission of an Ether frame to said Ether ports when said plurality of Ether Port correspond to a single MAC address to which said frame is to be transferred in a corresponding relationship between a MAC address to which said frame is to be transferred and Ether ports to which said frame is to be transferred stored in said MAC to port table memory, and increments and updates said counter value each time an Ether frame is transferred to one of said plurality of Ether ports.

16. The I/F apparatus according to claim 15, wherein an information processing device connected to said Ether cable transmits an ARP request frame having a broadcast MAC address at first transmission of an Ether frame.

17. The I/F apparatus according to claim 16, wherein said controller stores a corresponding relationship between a MAC address of said information processing device connected to said local bus and said bus port in said MAC to port table memory directly from said information processing device connected to said local bus at switching on power of said information processing device instead of storage based on a received Ether frame.

18. The I/F apparatus according to claim 16, wherein contents stored in said MAC to port table memory except a corresponding relationship between a MAC address of said information processing device connected to said local bus and said bus port are initialized at predetermined intervals.

19. The I/F apparatus according to claim 15, wherein said controller stores a corresponding relationship between a MAC address of said information processing device connected to said local bus and said bus port in said MAC to port table memory directly from said information processing device connected to said local bus at switching on power of said information processing device instead of storage based on a received Ether frame.

20. The I/F apparatus according to claim 19, wherein contents stored in said MAC to port table memory except a corresponding relationship between a MAC address of said information processing device connected to said local bus and said bus port are initialized at predetermined intervals.

21. The I/F apparatus according to claim 15, wherein contents stored in said MAC to port table memory except a corresponding relationship between a MAC address of said information processing device connected to said local bus ad said bus port are initialized at predetermined intervals.

22. A high-speed/high-reliability Ether transmission system comprising:
- a plurality of Ether cables,
- a local bus connected to an information processing device and having a higher speed than that of said Ether cables,
- and an I/F apparatus, said Ether cables being connected through said I/F apparatus to said local bus,
- wherein said I/F apparatus comprises:
- a plurality of Ether ports connected to said Ether cables,
- a bus port connected to said local bus,
- a controller connected to said Ether ports and said bus port,
- and a MAC to port table memory for storing a corresponding relationship between a MAC address to which an Ether frame is to be transferred and said Ether ports or said bus port to which said frame is to be transferred,
- wherein said controller refers to said MAC to post table memory when it receives an Ether frame having a MAC address to which said frame is to be transferred, and if said MAC address to which said time is to be transferred is stored in said MAC to port table memory, it transmits said Ether frame to a port to which said frame is to be transferred corresponding to said MAC address, or if said MAC address to which said frame is to be transferred is, not stored, it transits said Ether fate to ports except a port which has received said Ether frame and stores a corresponding relationship between a MAC address from which said Ether frame has been transferred and said port which has received said Eter frame in said MAC to port table memory, and
- wherein said controller also stores a counter value for specifying one of a plurality of said Ether ports in turn at transmission of an Ether frame to said Ether ports when said plurality of Ether ports correspond to a single MAC address to which said frame is to be transferred in a corresponding relationship between a MAC address to which said frame is to be transferred and Ether ports to which said form a is to be transferred stored in said MAC to part table memory, and increments and updates said counter value each time an Ether frame is transferred to one of said plurality of Ether ports.

23. The high-speed/high-reliability Ether transmission system according to claim 22, wherein an information processing device connected to said Ether cable transmits an ARP request frame having a broadcast MAC address at first transmission of an Ether frame.

24. The high-speed/high-reliability Ether transmission system according to claim 22, wherein an information processing device connected to said Ether cable transmits an ARP request frame having a broadcast MAC address at first transmission of an Ether frame.

25. A high-speed/high-reliability Ether transmission system comprising a network including information processing devices and hubs connected through Ether cables, a local bus having a higher speed than that of aid Ether cable, and an I/F apparatus, said network being connected through said I/F apparatus to said local bus, wherein said I/F apparatus comprises a plurality of Ether ports connected to said Ether cables, a bus port connected to said local bus, a controller connected to said Ether ports and said bus port, and a MAC to port table, memory for storing a corresponding relationship between a MAC addresses, to which an ether frame is to be transferred and said Ether ports or said bus port to which said frame is to be transferred, wherein said controller refers to said MAC to port table memory when it receives an Ether frame having a MAC address to which said frame is to be transferred, and if said MAC address to which said frame is to be transferred is stored in said MAC to port table memory, it transmits said Ether frame to a port to which said frame is to be transferred corresponding to said MAC address or if said MAC address to which said frame is to be transferred is not stored, it transmits said Eter frame to all ports except a port which has received said Ether frame and stores a corresponding relationship between a MAC address from which said Ether frame has been transferred and said port which has received said Ether frame in said MAC to port table memory, and wherein said controller also stores a counter value for specifying one of a plurality of said Ether pots in turn at transmission of an Ether frame to said Ether ports when said plurality of Ether ports correspond to a single MAC address to which said frame is to be transferred in a corresponding relationship between a MAC address to which said frame is to be transferred and Ether ports to which said frame is to be transferred stored in said MAC to port table memory, and increments and updates said counter value each time an Ether frame is transferred to one of said plurality of Ether ports.

26. The high-speed/high-reliability Ether transmission system according to claim 25, wherein an information processing device connected to said Ether cable transmits an ARP request frame having a broadcast MAC address at first transmission of an Ether frame.

27. The high-speed/high-reliability Ether transmission system according to claim 25, wherein an information processing device connected to said Ether cable transmits an ARP request frame having a broadcast MAC address at first transmission of an Ether frame.

28. A high-speed/high-reliability Ether transmission system comprising a plurality of Ether cables connected to plurality of information processing devices, respectively, a local bus connected to another information processing device and having a higher speed than that of said Ether cables, and an I/F apparatus, said Ether cables be connected though said I/F apparatus to said local bus, wherein said I/F apparatus cubes & plurality of Ether ports connected to said Ether cables, a bus port connected to said local bus, a controller connected to said Ether ports and said bus part, and a MAC to port table memory for storing a corresponding relationship between a MAC address to which an Ether frame is to be transferred and said Ether ports or said bus port to which said frame is to be transferred, wherein said controller reefers to said MAC to port table memory when it receives an Ether frame having a MAC address to which said frame is to be transferred, and if said MAC address to which said frame is to be transferred is stored in said MAC to port table memory, it transmits said Ether frame to a port to which said frame is to be transferred corresponding to said MAC address, or if said MAC address to which said frame is to be transferred is not stored, it transits said Ether frame to all ports except a port which has received said Ether frame and- stores a corresponding relationship between a MAC address from which said Ether frame has been transferred and said port which has received said Ether frame in said MAC to port table memory, and wherein said controller also stores a counter value for specifying one of a plurality of said Ether ports in tun at transmission of an Ether frame to said Ether ports when said plurality of Ether ports correspond to a single MAC address to which said frame is to be transferred in a corresponding relationship between a MAC address to which said frame is to be transferred and Ether ports to which said counter is to be transferred stored in said MAC to port table memory, and increments and updates said counter value each time an Ether frame is transferred to one of said plurality of Ether ports.

29. The high-speed/high-reliability Ether transmission system according to claim 28, wherein an information processing device connected to said Ether cable transmits an ARP request frame having a broadcast MAC address at first transmission of an Ether frame.

30. The high-speed/high-reliability Ether transmission system according to claim 28, wherein an information processing device connected to said Ether cable transmits an ARP request frame having a broadcast MAC address at first transmission of an Ether frame.

31. An I/F apparatus for connecting a network including information processing devices connected through Ether cables to another information processing device through a local bus having a higher speed than that of said Ether cables, comprising:

a plurality of Ether ports connected to said Ether cables;

a bus port connected to said local bus;

a controller connected to said Ether ports and to said bus port; and a MAC to port table memory for storing a corresponding relationship between a MAC address to which an Ether frame is to be transferred an said Ether ports or said bus port to which said frame is to be transferred, wherein said controller refers to said MAC to port table memory when it reeves an Ether frame having a MAC addresses to which said frame is to be transfer and if said MAC address to which said frame is to be transferred is stored in said MAC to port table memory, it transmits said Ether frame to a port to which said frame is to be transferred corresponding to said MAC address, or if said MAC address to which said frame is to be transferred is not stored, it transmits said Ether frame to all ports except a port which has received said Ether frame and stores a corresponding relationship between a MAC address from which said Ether frame has been transferred and said part which has received said Ether frame in said MAC to port table memory, and wherein said controller also stores a counter value for specifying one of a plurality of said Ether ports in turn at transmission of an Ether frame to said Ether ports when said plurality of Ether ports correspond to a single MAC address to which said flame is to be transferred in a corresponding relationship between a MAC address to which said frame is to be transferred and ether ports to which said frame is to be transferred stored in said MAC to port table memory, and increments and updates said counter value each time an Ether frame is transferred to one of said plurality of Ether ports.

* * * * *